US011870876B2

(12) United States Patent
Wheelock

(10) Patent No.: US 11,870,876 B2
(45) Date of Patent: Jan. 9, 2024

(54) ENHANCED DOCSIS PACKET CLASSIFICATION FOR TUNNELED TRAFFIC HAVING IPV4 AND IPV6 RULES MIXED IN A SINGLE UPSTREAM (US) AND/OR DOWNSTREAM (DS) TRAFFIC CLASSIFIER

(71) Applicant: ARRIS Enterprises LLC, Suwanee, GA (US)

(72) Inventor: Ian G Wheelock, Cork (IE)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/708,177

(22) Filed: Mar. 30, 2022

(65) Prior Publication Data
US 2022/0353352 A1     Nov. 3, 2022

Related U.S. Application Data

(60) Provisional application No. 63/181,655, filed on Apr. 29, 2021.

(51) Int. Cl.
*H04L 12/00*     (2006.01)
*H04L 69/163*     (2022.01)
(Continued)

(52) U.S. Cl.
CPC ........ *H04L 69/163* (2013.01); *H04L 61/5007* (2022.05); *H04L 69/167* (2013.01); *H04L 69/22* (2013.01)

(58) Field of Classification Search
CPC . H04L 69/163; H04L 61/5007; H04L 69/167; H04L 69/22; H04L 69/16; H04L 47/2441
(Continued)

(56) References Cited

U.S. PATENT DOCUMENTS 7,653,061 B2 * 1/2010 Park .................. H04L 69/167
370/392
9,270,592 B1 * 2/2016 Sites .................. H04L 45/745
(Continued)

FOREIGN PATENT DOCUMENTS

CN    101247308 A   *   8/2008   .......... H04L 61/251
CN    102143250 A   *   8/2011   .......... H04L 61/251
(Continued)

OTHER PUBLICATIONS

International Search Report and the Written Opinion of the International Searching Authority dated June 15, 2022 in International (PCT) Application No. PCT/US2022/022434
(Continued)

*Primary Examiner* — Frantz Coby
(74) *Attorney, Agent, or Firm* — Wenderoth, Lind & Ponack, L.L.P.

(57) ABSTRACT

A network device includes a memory and a processor. The processor implements at least one classifier to provide classification for tunneled IPinIP traffic based on classification parameters provided by Internet Protocol Version 6 (IPv6) classification encoding, Internet Protocol Version 4 (IPv4) classification encoding, and Transport Control Protocol/User Datagram Protocol (TCP/UDP) classification encodings, wherein one of the IPv6 classification encoding and the IPv4 classification encoding is provided by extension information to provide extended classification capabilities. The processor uses the at least one classifier to compare the classification parameters provided by the IPv6 classification encoding, the IPv4 classification encoding, and the TCP/UDP classification encodings to fields in an IPv6 header, an IPv4 header, and a TCP/UDP header of the IPinIP packet. Based on the comparison, the processor maps the
(Continued)

IPinIP packet to a service flow identified by the classification parameters.

20 Claims, 11 Drawing Sheets

(51) Int. Cl.
*H04L 61/5007* (2022.01)
*H04L 69/167* (2022.01)
*H04L 69/22* (2022.01)

(58) Field of Classification Search
USPC .................................................. 709/238–242
See application file for complete search history.

(56) References Cited

U.S. PATENT DOCUMENTS

| | | | | |
|---|---|---|---|---|
| 11,418,444 | B2 * | 8/2022 | Lee ..................... | H04L 41/0806 |
| 2004/0013130 | A1 * | 1/2004 | Blanchet ................ | H04L 69/16 370/466 |
| 2004/0088385 | A1 * | 5/2004 | Blanchet ............... | H04L 61/251 709/220 |
| 2004/0133692 | A1 * | 7/2004 | Blanchet ................ | H04L 67/14 709/230 |
| 2005/0099976 | A1 * | 5/2005 | Yamamoto .......... | H04L 12/4633 370/395.54 |
| 2008/0186203 | A1 * | 8/2008 | Vaswani ............. | H04L 61/5007 340/870.11 |
| 2022/0353352 | A1 * | 11/2022 | Wheelock ............. | H04L 69/163 |

FOREIGN PATENT DOCUMENTS

| | | | | | |
|---|---|---|---|---|---|
| GB | 2417650 | A | * | 3/2006 | ......... H04L 12/4633 |
| KR | 100772537 | B1 | * | 11/2007 | ......... H04L 61/2592 |
| KR | 20080050973 | A | * | 6/2008 | ........... H04L 61/251 |
| WO | WO-2004049668 | A1 | * | 6/2004 | ......... H04L 12/4633 |

OTHER PUBLICATIONS

K.V.S. Mounika et al: "IPV6 and Deep Packet Inspection", International Journal of Innovative Technology and Exploring Engineering (IJITEE), Nov. 1, 2012 (Nov. 1, 2012), pp. 2278-3075, XP055517676

* cited by examiner

ENHANCED DOCSIS PACKET CLASSIFICATION FOR TUNNELED TRAFFIC HAVING IPV4 AND IPV6 RULES MIXED IN A SINGLE UPSTREAM (US) AND/OR DOWNSTREAM (DS) TRAFFIC CLASSIFIER

BACKGROUND

The subject matter of the present disclosure relates generally to providing enhanced DOCSIS (Data Over Cable Service Interface Specification) classification having IPv4 and IPv6 rules mixed in a single upstream (US) and/or downstream (DS) traffic classifier.

Network address translation (NAT) is a method of mapping an IP address space into another by modifying network address information in the IP header of packets while they are in transit across a traffic routing device. One Internet-routable IP address of a NAT gateway can be used for an entire private network. An entire IP address space, usually consisting of private IP addresses, may be hidden behind a single IP address in another, usually public address space. The hidden addresses are changed into a single (public) IP address as the source address of the outgoing IP packets, so they appear as originating not from the hidden host but from the routing device itself.

A Cable Modem (CM) configuration file is downloaded by CM during bootup and used to configure service between CM and a Cable Modem Termination System (CMTS) during registration. Service Flows (SFs) and Traffic Classifiers (TCs) in a CM configuration file identify Quality of Service (QoS) SFs and what traffic flows should be assigned by a TC to that QoS. Configuration information may also be sent in DSX (Dynamic Service) messages. DOCSIS defines SFs and TC type-length-values (TLVs), and supports extensions, such as Vendor Specific Extensions (VSE) so that custom options/operations may be defined.

Dual-Stack Lite (DSLite) relies on a DS-Lite Basic Bridging BroadBand (B4) element and a DS-Lite Address Family Transition Router (AFTR) element. The B4 connects with the service provider access network using the IPv6 address allocated by the service provider and uses this IPv6 address to establish tunnel with the AFTR device. The AFTR element terminates the tunnel created with the B4 element. B4 and AFTR IPv6 tunnel endpoint addresses are constant for duration of tunnel.

DSLite takes [IPv4][TCP/UDP] (Internet Protocol version 4 and Transport Control Protocol/User Datagram Protocol) traffic and encapsulates in it [IPv6] (Internet Protocol version 6) header for transport across IPv6 network between the B4 element which may be part of a Gateway (GW), and the AFTR element. Such a packet may be referred to as a tunneled IPinIP packet. DSLite traffic passes through the CMTS as [IPv6][IPv4][TCP]. DOCSIS prohibits both IPv4 and IPv6 classifier encodings in a single classification rule. Thus, an error is generated if IPv4 and IPv6 rules are mixed in a single upstream (US) or downstream (DS) TC.

Because a tunneled IPinIP packet, e.g., [IPv4][TCP] packet having a IPv6 packet header added, cannot be classified, only the IPv6 Traffic Class (TC) value, i.e., DSCP (Differentiated Services Code Point), as the only classifier, is left for performing classification. The IPv6 TC value is copied from the IPv4 packet by AFTR, and in a large percentage of case, e.g., 40% or more, may have been bleached by the Internet.

Thus, mixing IPv6 and IPv4 classification for tunneled IPinIP packets is desired.

SUMMARY

An aspect of the present disclosure involves a system and method to provide enhanced DOCSIS classification having IPv4 and IPv6 rules mixed in a single upstream (US) or downstream (DS) traffic classifier.

A network device that includes a memory storing computer-readable instructions and a processor configured to execute the computer-readable instructions to implement at least one classifier to provide classification for tunneled IPinIP traffic, the at least one classifier including classification parameters provided by IPv6 classification encoding, IPv4 classification encoding, and Transport Control Protocol/User Datagram Protocol (TCP/UDP) classification encodings, wherein one of the IPv6 classification encoding and the IPv4 classification encoding is provided by extension information to provide extended classification capabilities, receive a tunneled IPinIP packet that includes an IPv6 header, an IPv4 header; and a TCP/UDP header, use the at least one classifier to compare the classification parameters provided by the IPv6 classification encoding, the IPv4 classification encoding, and the TCP/UDP classification encodings to fields in an IPv6 header, an IPv4 header, and a TCP/UDP header of the IPinIP packet, and, based on the comparison, map the IPinIP packet to a service flow identified by the classification parameters.

The received tunneled IPinIP packet may include an IPv6 Next Header field value of 4 in the IPv6 header that indicates the received tunneled IPinIP packet includes an embedded IPv4 header.

The IPv4 classification encoding may be provided by the extension information, the at least one classifier providing IPv6+IPv4+TCP/UDP classification by evaluating the IPv6 header, evaluating the embedded IPv4 header, and evaluating the TCP/UDP header.

The evaluating the IPv6 header may include evaluating at least one of a Source IPv6 address or Destination IPv6 address, a Traffic Class, and a Flow Label.

The IPv4 classification encoding may be provided by the extension information, the IPv4 classification encoding including instructions for the at least one classifier to skip the IPv4 header, wherein the at least one classifier provides [IPv6][TCP/UDP] classification by evaluating the IPv6 header, skipping the IPv4 header, and evaluating the TCP/UDP header.

The at least one classifier evaluates the TCP/UDP header to identify TCP/UDP port values to assign the received tunneled IPinIP packet to a low latency service flow.

The IPv6 classification encoding is provided by the extension information, the IPv6 classification encoding including instructions for the at least one classifier to skip the IPv6 header, wherein the at least one classifier provides [IPv4][TCP/UDP] classification by skipping the IPv6 header, and evaluating the IPv4 header and the TCP/UDP header, or skipping the IPv4 header and evaluating the TCP/UDP header.

The extension information comprises a Vendor-Specific Extension (VSE).

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

Figure 1:
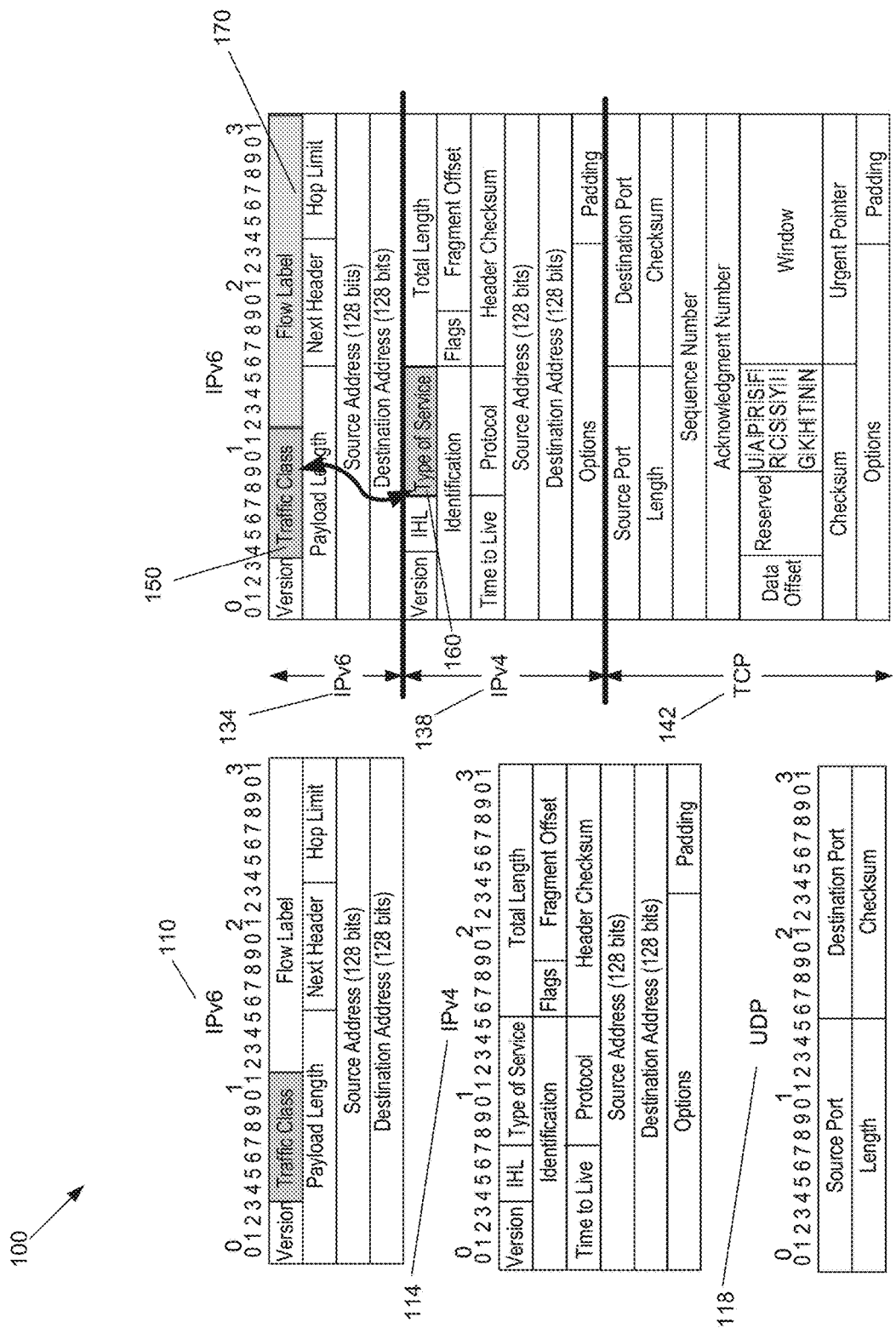
FIG. 1 illustrates various headers for providing information at the beginning of packets.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

DOCSIS offers broadband internet access over cable networks, relying on the Cable Modem Termination System (CMTS) in the cable operator headend/network operations center, and Cable Modems (CMs) that are deployed in broadband subscriber homes. DOCSIS supports both Centralized Access Architectures (CAA) as well as Distributed Access Architectures (DAA). The key difference here is where the DOCSIS Medium Access Control (MAC) and Physical (PHY) layer handling of the overall CMTS is implemented.

In CAA architectures the CMTS MAC and PHY are generally composed within a single HW platform. In one DAA architecture, the CMTS MAC is centralized and the PHY is distributed deep into the network (commonly known a Remote PHY Device (RPD), while another DAA architecture moves the CMTS MAC and PHY to deep within the network (commonly known as Remote MAC & PHY Device (RMD)). The CMs do not care about the CAA or DAA architectures, as they expect to connect to a DOCSIS network as specified by the CableLabs suite of protocol specifications.

The MAC and Upper Layer Protocols Interface Specification for DOCSIS (CM-SP-MULPIv3.1-I20-200407) clearly defines the details of the SFs (that differ between US and DS Quality of Service (QoS)) and the TCs that are used to direct traffic to the SFs. The TCs are mostly the same for US and DS traffic, and are basically traffic filters applying to DOCSIS MAC layer, Layer-2 (ETH) and Layer-3 (IP) layers within received traffic. They can be setup in a prioritized order to ensure control over the TC evaluation.

Currently the DOCSIS Specification includes TC definitions relating to handling IPv4, IPv6 and TCP/UDP traffic. The TC definitions normally assume only IPv4 packets or IPv6 packets and avoids any narrative relating to tunneled packets, such as SoftGRE (Soft Generic Routing Encapsulation), L2TPv3 (Layer 2 Tunneling Protocol version 3) or IPinIP (such as DSLite). As such, any traffic that happens to embed one protocol within another has no definition available for implementers to use. This lack of capability effectively means that the level of granularity available for traffic classification is limited to the outer protocol header, reducing the functionality of the MAC domain to (in most cases) a single SF per CM. Some protocols insist on copying certain inner protocol fields to the outer field, such as DSLite (where an implementation must copy the DSCP/TOS bits from IPv4 to IPv6 Traffic Class in the B4 node, and the reverse in the AFTR node—the CM and CMTS sit in between the B4 and AFTR node). Having the ability for the CM and CMTS to look beyond the outer header in the case of tunneled protocols would enable more granular classification capabilities rather than being restricted to a single 6-bit value (DSCP/TOS) in the outer header.

DOCSIS operates by having TCs that are used to identify specific matching packets attached to SFs (that provide the necessary QoS). Logical linkages exist to keep the various packet classification details with an TC, as well as logical linkages tying Traffic Classifiers (TCs) to SFs. Packet classification encodings described in the DOCSIS specification indicated that all CMTS must support IPv4 and IPv6 classification encodings In addition, the DOCSIS specification also describes detail information on Layer 4 (TCP/UDP) packet classification encodings. If TDP/UDP classification encoding is present and IPv4 encoding is present in a classification rule, then the classifier would only match IPv4 packets, and similarly states that if a IPv6 header is present then the classifier only matches on IPv6 packets.

Clearly this only covers the case of [IPv4][TCP/UDP] or [IPv6][TCP/UDP] and does not cover the case of [IPv6][IPv4][TCP/UDP] as found in DSLite, or other such combinations of tunneled protocol headers. The DOCSIS specification further states that if IPv4 classifier settings are mixed with IPv6 classifier settings then this SF classifier is invalid and must be errored and a failure is triggered in whatever process is being performed, e.g., DOCSIS Registration or DOCSIS DSX. As a result, the standard defined fields cannot be relied upon, as they break DOCSIS Classification Rules.

Aspects of the present disclosure are directed to providing enhanced DOCSIS classification having IPv4 and IPv6 rules mixed in a single upstream (US) or downstream (DS) traffic classifier.

FIG. 1 illustrates various headers 100 for providing information at the beginning of packets.

FIG. 1 shows an Internet Protocol version 6 (IPv6) header 110, an Internet Protocol version 4 (IPv4) header 114, and a User Datagram Protocol (UDP) header 118. The UDP header 118 is a simple header for transport control. but does not include fields that are used for connection maintenance and does not provide reliable transport.

DS-Lite uses IPv4-in-IPv6 tunneling to send a subscriber's IPv4 packet through a tunnel on the IPv6 access network to the ISP. In FIG. 1, an IPv4 header 138 is placed after the IPv6 header 134. Because IPv4 addresses are becoming depleted, broadband service providers (DSL, cable, and mobile) need new addresses to supply new customers. Providing IPv6 addresses alone is often not workable because most of the systems that make up the public Internet are still enabled to support only IPv4, and many customer systems do not yet fully support IPv6. When a customer's device sends an IPv4 packet to an external destination, the IPv4 packet is encapsulated in an IPv6 packet for transport into the provider network. These IPv4-in-IPv6 tunnels are called softwires 214. Tunneling IPv4 over IPv6 is simpler than translation and eliminates performance and redundancy concerns.

The IPv6 header includes a Traffic Class (TC) field 150 and a Flow Label (FL) field 170. The TC field 150 is an 8-bit field that is used to signify the importance of the data contained within this specific packet. The TC field 150 used with IPv6 supports DSCP. A flow is a stream of traffic that is coming from one source and destined for one or more destinations. A flow may contain multiple packets which can each be treated exactly the same way by intermediate routing devices. The FL field 170 is used to identify these flows and enables these intermediate routing devices to treat all of the packets within the flow the same. This reduces processing time and consequently delay. The value of TC field 150 in an IPv6 packet is copied into the Type of Service (ToS) field 160 of the corresponding IPv4 packet during the encapsulation process, and vice versa during the de-capsulation process. A TCP header 142 or a UDP header 118 may follow the IPv4 header 138.

Both UDP and TCP run on top of IP and are sometimes referred to as UDP/IP or TCP/IP; however, there are important differences between the two. For example, UDP header 118 enables process-to-process communication, while TCP header 142 supports host-to-host communication. Furthermore, TCP sends individual packets and is considered a reliable transport medium. On the other hand, UDP sends messages, called datagrams, and is considered a best-effort mode of communications, which means the service does not provide any guarantees that the data will be delivered or offer special features to retransmit lost or corrupted messages. The UDP header 118 provides port numbers to help distinguish different user requests and, optionally, a checksum capability to verify that the data arrived intact.

Figure 2:
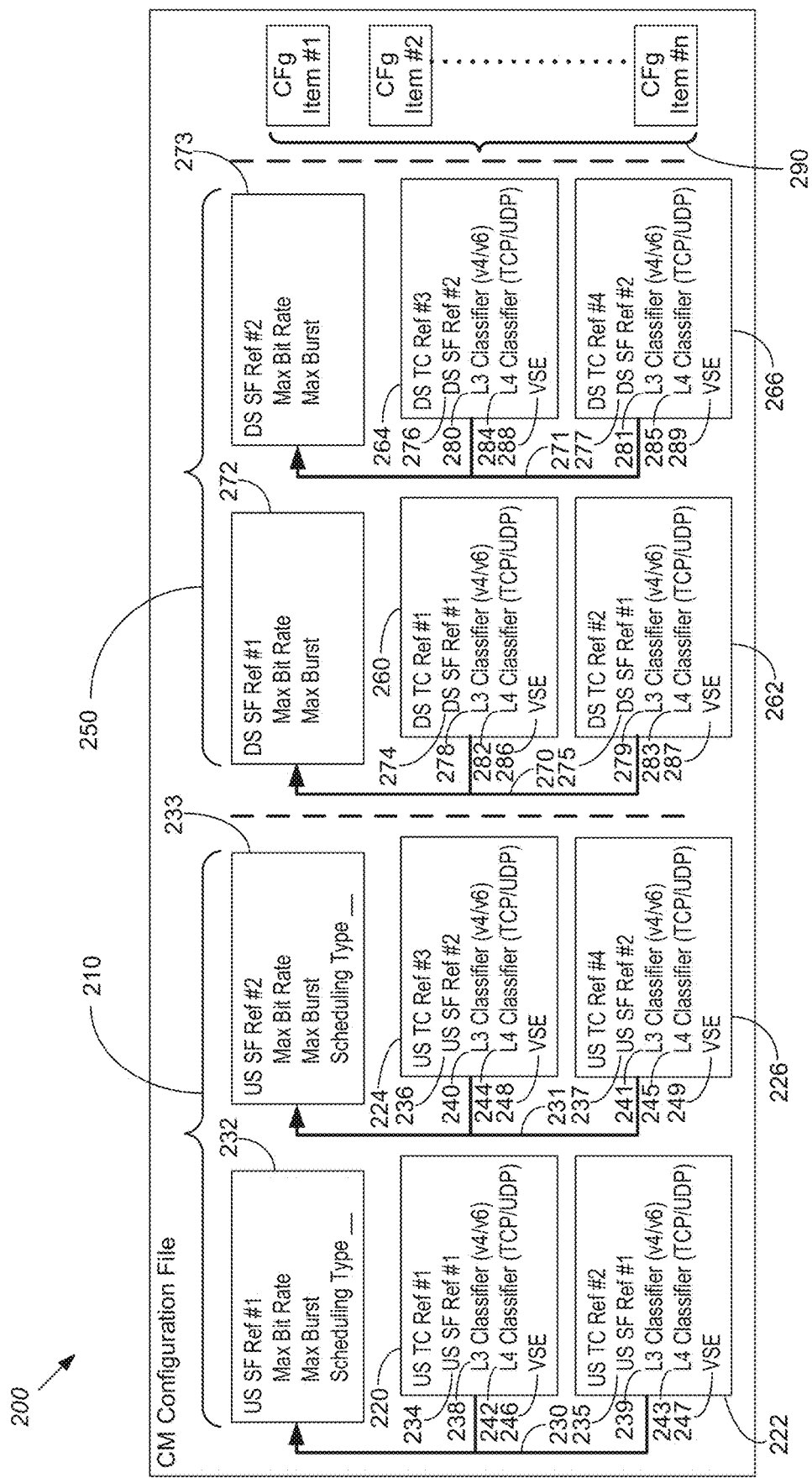
FIG. 2 illustrates a configuration file.

FIG. 2 illustrates a configuration file 200.

In FIG. 2, for DOCSIS, a configuration file 200 is used to provision the QoS and the traffic flows between a CMTS and a CM. DOCSIS defines all of the information about service flows and traffic classifiers, as well as supporting the additional coding for extensions, such as vendor specific extensions. FIG. 2 shows an example of a configuration file with upstream SF 210 and downstream SFs 250. There are US TCs 220, 222, 224, 226 and DS TCs 260, 262, 264, 266. In FIG. 2, the relationships 230, 231, 270, 271 between the TCs 220-226, 260-266 and the individual SFs 240, 242, 280, 282.

The TCs 220-326, 260-266 are associated with a SF 240, 242, 280, 282 using an associated US reference, e.g., US SF Ref #1 244, US SF Ref #2 245, US SF Ref #3 246, US SF Ref #4 247, or DS reference, e.g., DS SF Ref #1 274, DS SF Ref #2 275, DS SF Ref #3 276, DS SF Ref #4 277. The TCs 220-226, 260-366 also include classification for layer 2 information 238-241, 278-281, which is IPv6 or IPv4. Layer 2 classification, although not shown, is also possible where a header may include a 2-bit priority field that enables eight priority classes.

Vendor specific encoding would also apply within the context of the traffic classifier. The TCs 220-226, 260-266 include classification for layer 4 information 242-245, 282-285, which is TCP/UDP. The TCs 220-226, 260-266 may also include extension encodings 246-249, 286-289, such as a Vendor-Specific Extension, which may provide special classifications as describe herein below. These extension may be used to define custom operations as opposed to only the operations defined in the DOCSIS specification. Additional configuration information 290, such as CFg Item #1-n, may be included, for example, to specify the operation of a cable modem etc.

Figure 3:
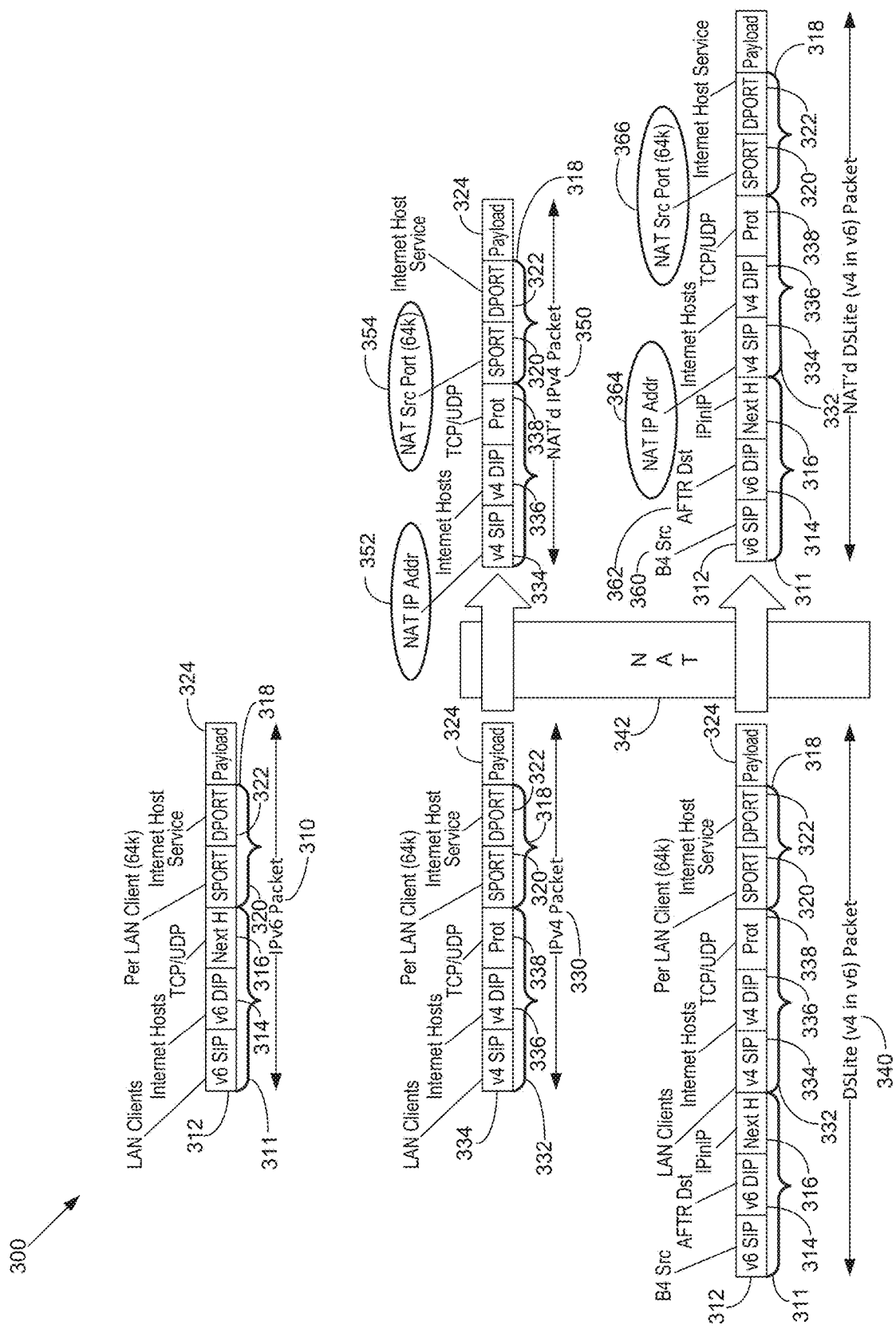
FIG. 3 illustrates classification of different IP packets.

FIG. 3 illustrates classification of different IP packets 300.

FIG. 3 shows an IPv6 packet 310. The header 311 of IPv6 packet 310 an IPv6 Source IP (SIP) field (v6SIP) 312, an IPv6 Destination IP (DIP) address field (v6DIP) 314, and a Next Header field (NextH) 316. A TCP/UDP header 318 includes a Source Port address field (SPORT) 320 and a Destination Port address field (DPORT) 322. The payload or data 324 follows the TCP/UDP header 318.

Next, an IPv4 packet 330 is shown. The IPv4 packet 330 includes an IPv4 header 332 with an IPv4 SIP field (v4SIP) 334, an IPv4 DIP field (v4DIP) 336, and a Protocol field (Prot) 338. A TCP/UDP header 318 includes a SPORT field 320 and a DPORT field 322.

Next, a DSLite packet 340 has a IPv6 header 311, an IPv4 header 332, and a TCP/UDP header 318. The payload or data 324 follows the TCP/UDP header 318. For layer 3 classification, the IPv6 source IP address (v6SIP) 312 and the IPv6 destination IP address (v6DIP) field 314 in the IPv6 header 311 are used for classification. For a TCP/UDP classifier, the SPORT 320 and DPORT 322 values along with the Protocol field (Prot) 338 are used. Within a home network, the IPv4 SIP 334 in the IPv4 header 332 can vary. The first step is to identify the tunnel using the IPv6 SIP 312 and the IPv6 DIP 314. The IPv6 SIP 312 and the IPv6 DIP 314 values are constant and do not change for the duration of the tunnel.

For normal DSLite packets, the IPv4 SIP 334 in the IPv4 header 332 constantly changes for packets within the tunnel because it is taken from the address of clients in a home network. There can be up to 253 normal LAN clients within the home network with 253 different IPv4 SIPs 334. The IPv4 DIP 336 is the Internet host, which may be Google, Microsoft, etc., that the client is seeking a connection. So, the IPv4 DIP 336 may also change, but not as frequently as the iPv4 SIP 334. From a classic packet classification point of view, the IPv4 SIP 334 has to be uniquely classified because it changes and a specific classifier that matches the IPv4 SIP 334 has to be invoked. For the SPORT 320, every single client in the network has up to 64,000 different port values that can be used. With 64,000 SPORT values 320 for each client, and up to 253 clients, there is a lot of variability possible. Thus, to identify unique flow, an IPv4 SIP 334 and a SPORT value 320 are used to uniquely identify the associated packet flow. Because what addresses are assigned to what client in home network is not known, and the SPORT 320 that is going to be used is unknown, it is difficult to pick out a flow ahead of time for low latency treatment. The SPORT 320 can be the same from different LAN clients at the same time. It is possible to identify the particular device and the SPORT 320 that the device is going to use. A DSX message transaction may be initiated to set up a unique classifier. However, this results in a heavy workload on the network device, the CMTS and the cable modem. Further, there can be scaling issues. Thus, it is desirable to avoid using the DSX messaging transaction.

Figure 4:
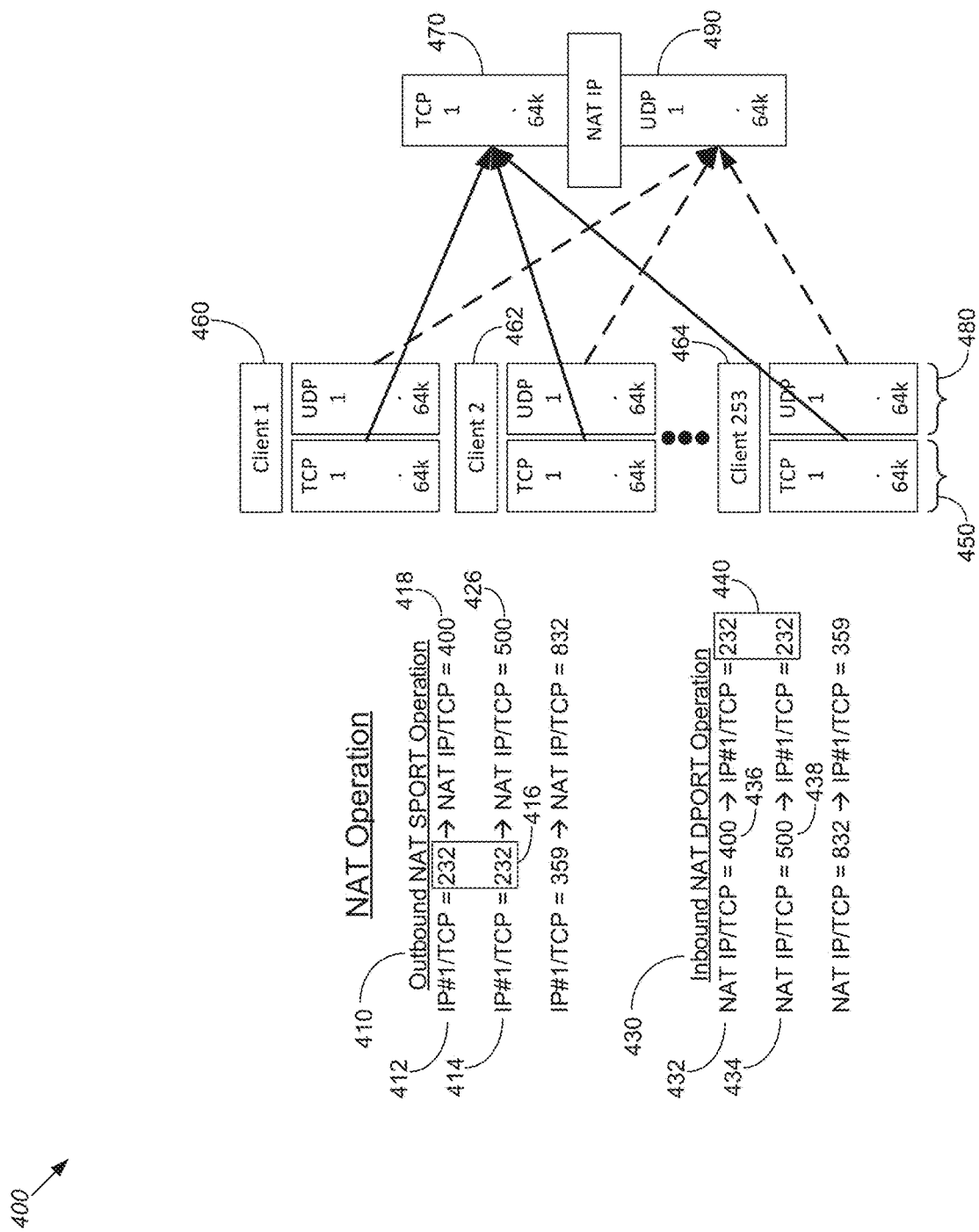
FIG. 4 illustrates the NAT operation.

FIG. 4 illustrates the NAT operation 400.

In FIG. 4, an outbound NAT SPORT operation 410 and an inbound NAT SPORT operation 430 are shown. Within a home network there can be up to 253 possible clients. Each of these clients have a name space of 64,000 for TCP values, and similar for UDP. When packets are sent to the Internet, that client has its IP address transformed into the NAT IP address, and it's TCP SPORT address is transformed into one of the available TCP ports on the NAT IP address. This effectively compresses all of the clients down to single IP address, and compresses all of the possible TCP and UDP values down to a single 64K range for TCP and similarly for UDP on the NAT device.

FIG. 4 shows that two outbound packets 412, 414 have the same TCP SPORT value 416 of 232, but they are mapped to different NAT TCP SPORT values 418, 420, i.e., NAT TCP SPORT values of 400 and 500, respectively.

When packets are received, NAT performs the reverse lookup. The two inbound packets 432, 434 have NAT TCP DPORT values 436, 438, NAT TCP DPORT values of 400 and 500, respectively. The NAT translates the inbound NAT TCP DPORT values 436, 438 back to the appropriate TCP DPORT value 440, i.e., TCP DPORT value of 232 for both. So the inbound packets 432, 434 are able to be sent back to the appropriate client in the home with the appropriate DPORT.

Also in FIG. 4, TCP packets 450 from Client 1 460, Client 2 462, Client 253 464 are mapped to a single TCP range 470. Similarly, UDP packets 480 from Client 1 460, Client 1 462, Client 1 464 are mapped to a single UDP range 490.

Referring again to FIG. 3, the WAN side will be explained. The incoming IPv4 packet 330 gets transformed by NAT 340 into the outgoing IPv4 packet 350 and the NAT IP address 352 is applied at the IPv4 SIP 334, and therefore no longer change in the DSLite tunnel. The NAT SPORT value 354 is applied at the TCP SPORT field 320, and can change within the DSLite tunnel, but are now unique and identify individual flows.

The bottom of FIG. 3 shows how the tunneled IPinIP DSLite packet 340 is handled by the NAT 342. The B4 element tunnel endpoint address (B4 SIP) 360 and the AFTR IPv6 tunnel endpoint address (AFTR DIP) 362 are constant for the duration of the tunnel. The NAT IP address 364 and the NAT SPORT 366 are applied to the outbound packet by the NAT device 342. The IPv6 fields, i.e., the IPv6 SIP field 312, the IPv6 DIP field 314, and the Next Header field 316 remain constant. The IPv6 fields can be ignored in terms of the IP addresses because the NAT IPv4 SIP address 334 is now the NAT IP address 364 that is used to route the packet. All of the SPORT ranges for each of the clients in the home network has been reduce to a single range of 64K values provided by the NAT device 342 for NAT SPORT values 320. The operations by the NAT device 342 relate to how the CMTS handles classification. Thus, the SPORT value 320 and DPORT value 322 are statically set in the configuration file. By using the NAT device 342 in the gateway, variability from the IPv4 SIP 334 and the SPORT 320 is removed by using a single SIP (NAT IP address 364) and a single range of 64,000 ports (NAT SPORT 366).

Rather than having a classifier that is IPv6, IPv4 and TCP, a single TCP classifier may be used. With the single TCP classifier, traffic may be identified as low latency and it can be mapped into the low latency SFs in both the upstream and downstream direction. Currently, DSLite does not allow this. With DSLite, classification is limited to IPv6 SIP 312, IPv6 DIP 314, and the Next Header field 316. So, visibility is completely constrained to the first three fields, and there is no visibility into the rest of the packet. So the advantages are provided by a combination of NAT 342 as well as some features described herein below.

Again, DSLite classification cannot allow IPv6 and IPv4 classification at the same time. So DSLite does not allow classification of the IPv4 values (IPv4 SIP 334, IPv4 DIP 336, Prot 338) within the IPv6 packet 340.

This leaves one field within the IPv6 header 311, which is the traffic class field (TC field) for use by a classifier. However, it is estimated that 40% of these values are bleached or zeroed out and thus provide no value because their value is lost.

Several classification operations are discussed herein. A network device implements at least one classifier to provide classification for tunneled IPinIP traffic based on classification parameters provided by IPv6 classification encoding, IPv4 classification encoding, and TCP/UDP classification encodings, wherein one of the IPv6 classification encoding and the IPv4 classification encoding is provided by extension information to provide extended classification capabilities.

The first classification operation provides full classification, even though this is prohibited by the DOCSIS specification as it stands today.

Figure 5:
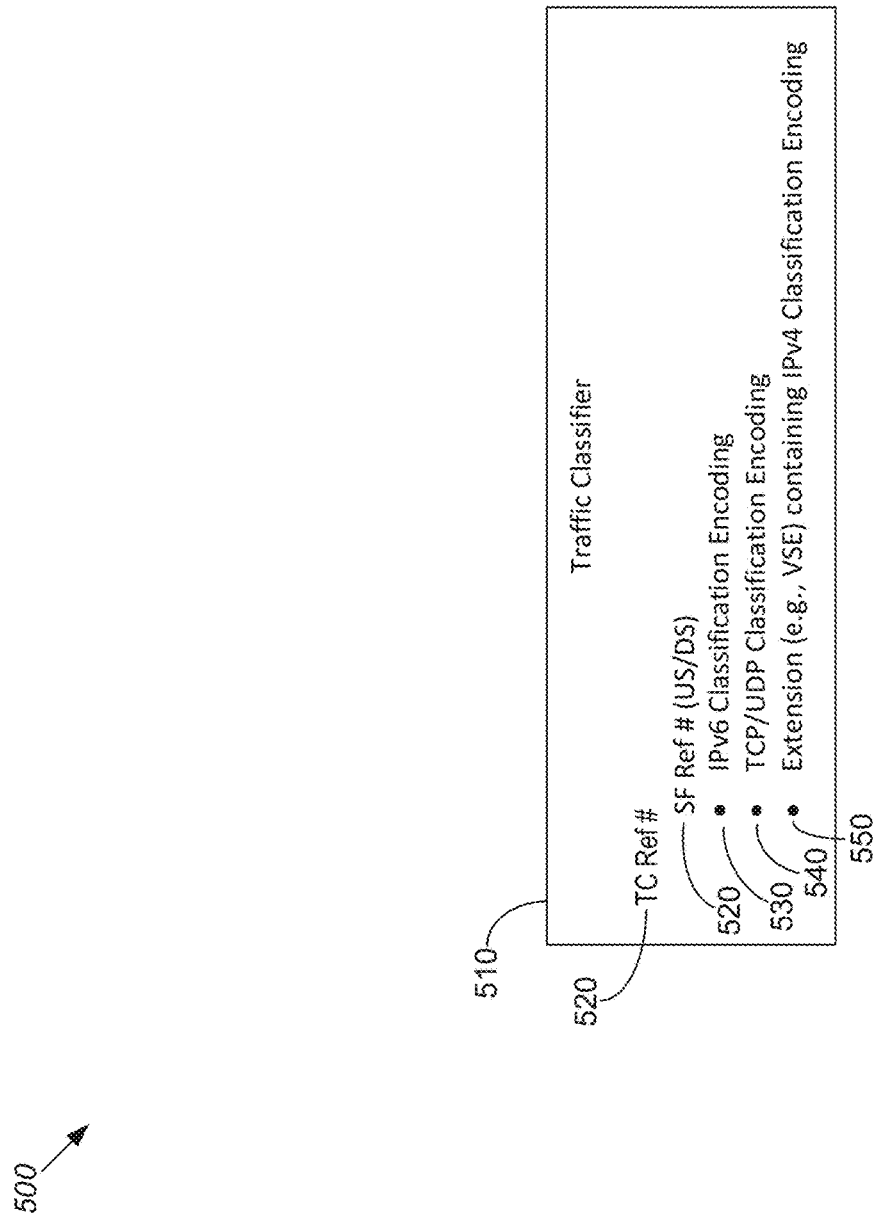
FIG. 5 illustrates classification encodings for combined [IPv6][IPv4][TCP/UDP] classification.

FIG. 5 illustrates classification encodings for combined [IPv6][IPv4][TCP/UDP] classification 500.

In FIG. 5, a classifier 510 is shown. The classifier 510 includes a Traffic Classifier reference number 520. A SF reference number 520 is also provided. The classifier includes three classifier rules that provides IPV 6 classification coding 530, TCP classification coding 540, and embed Extension IPv4 classification encodings 550 in an additional encoding or extension. The Extension IPv4 encoding 550 may be a Vendor Specific Encoding (VSE). Using an extension, such as VSE, still adheres to the DOCSIS rules that prohibits IVv6 and IPv4 classification in the same classification rule. Alternatively, the DOCSIS specification and the classification coding for the CMTS may be modified to not generate an error condition when IPv6 and IPv4 classification are mixed. However, using an extension, such as Extension IPv4 classification encodings 550 is a simpler task. Thus, extensions, such as VSE encodings, are possible to provide mixed IPv6 and IPv4 classification.

The TC 510 for DSLite then becomes:

IPv6 Classification Encodings (consistent with DOCSIS specification C.2.1.10)

TCP/UDP Classification Encodings (consistent with C.2.1.7)

Extension containing IPv4 Classification Encodings (consistent with C.2.1.6).

When installed in the DOCSIS MAC, the extension, e.g., VSE IPv4 classification encoding 550, is processed by the processor of the network device to implement a complete classifier as per DSLite, as follows:

<IPv6><VSE including IPv4><TCP/UDP>.

Because the IPv4 classification encodings are contained in an extension such as VSE, an error is not generated. VSE includes additional information that tells the network device, when processing the classifier, to perform the full IPv6 classification, the IPv4 classification and the full TCP classification.

Figure 6:
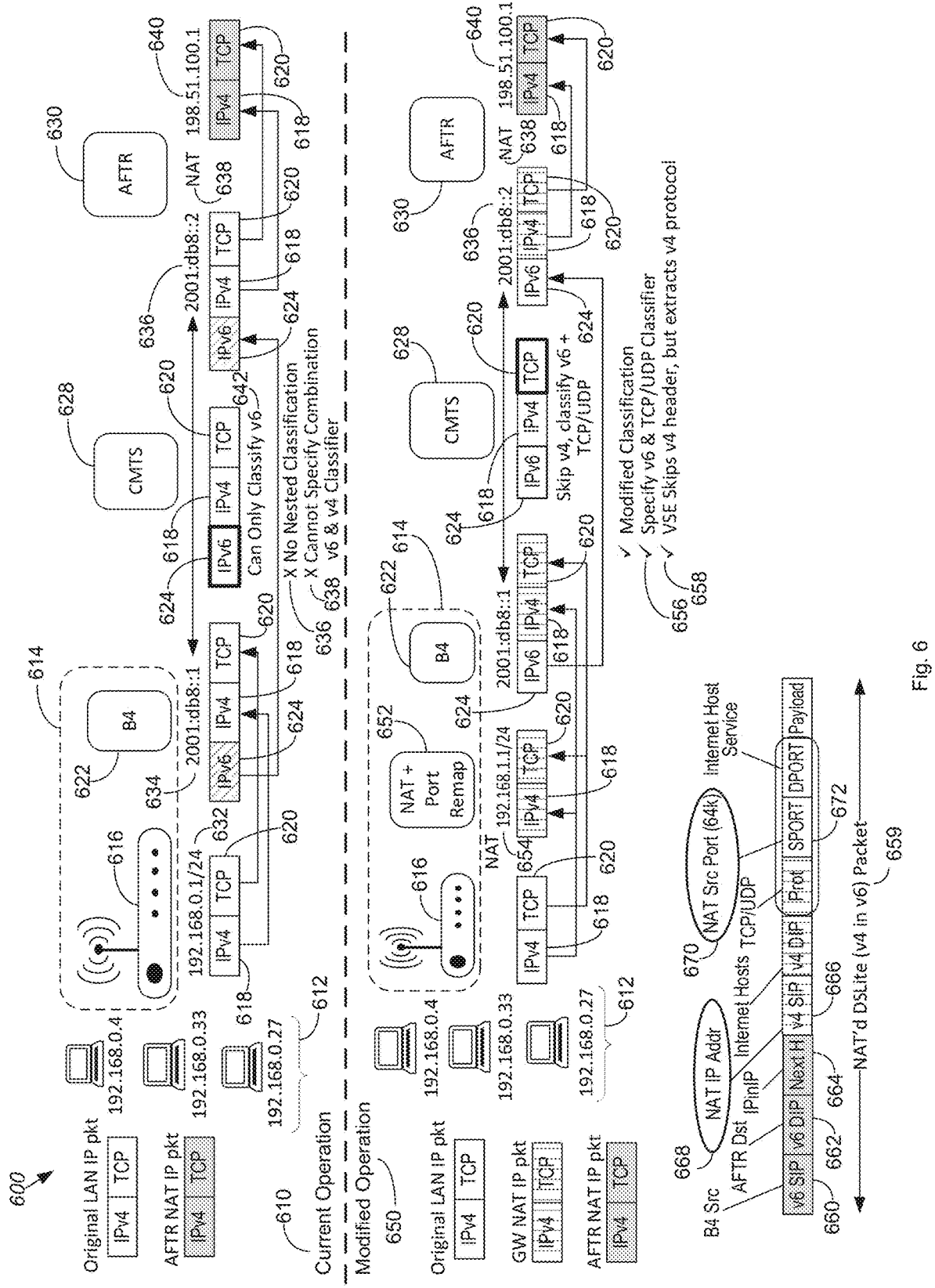
FIG. 6 illustrates a current operation and a modified skip IPv4 classification process.

FIG. 6 illustrates a current operation and a modified skip IPv4 classification process 600.

In FIG. 6, the current operation 610 shows that traffic from any client 612 in the home goes through the gateway 614 in the home. ACM 616 may be provided in the gateway 614. The IPv4 packet includes an IPv4 header 618 and a TCP header 620. The IPv4 packet is then received by the B4 element 622 and the IPv6 header 624 is added onto the IPv4 packet to form an IPinIP packet for a DSLite tunnel. The IPinIP packet is delivered to the CMTS 626. However, the CMTS 628 can only classify using the values in the IPv6 header 624 and cannot classify using the values in the IPv4 header 618 or the values in the TCP header 620. So this packet flows all the way through from the left-hand side up to the AFTR node 630 and then to the Internet.

The IPv4 packet received by the gateway 614 has a source IP address 632. The B4 element 622 creates an DSLite tunnel identified by the TCP SPORT 634 at the B4 622 and the TCP DPORT 636 at the AFTR node 630. The AFTR node 630 performs operations using NAT 638 send the IPv4 packet using the IPv4 DIP 640. Because only the IPv6 header 624 can be used for classification 642, the CMTS 630 cannot determine individual unique flows at the IPv4 618 and TCP 620 level. Thus, there is no nested classification 644 and a combination of a IPv6 and IPv4 classifier cannot be specified 646.

FIG. 6 shows a modified classification operation 650 that involves skipping or ignoring the IPv4 field 618, which means that the SPORT and DPORT values in the TCP/UDP header 620 must be unique between all the LAN clients 612 in the home. Such uniqueness cannot happen naturally and requires the GW 614 to perform NAT 652 to map all LAN clients 612 to a single output IP address 654 in a different subnet.

IPv4 NAT must operate between subnets. DSLite provides a first subnet. subnet #1, for the DHCP server in the GW for LAN clients. A second subnet, subnet #2, is added and is used for the address used by the NAT 652 towards the B4 element 622 in the GW 614. All LAN devices are translated to subnet #2, "0.1" address 654, and this traffic is processed by the B4 element 622. Including NAT 652 in the GW 614 means that the output ports in the TCP/UDP header 620 are guaranteed to be unique.

The GW 614 and the home network are the same setup as before. But the values for the IPv4 header 618 and TCP header 620 are translated by NAT 652 and port remapped. The values in the IPv4 header 618 are remapped by NAT 652 to unique values in the IPv4 header 618 and TCP header 620. At the B4 element 622, an IPv6 header 624 is added to the IPv4 packet. The IPv6 tunnel packet is sent to the CMTS 628. In FIG. 6, the configuration file tells the CMTS to skip the field in the IPv4 header 618 and classify using the IPv6 header 624 and the values in the TCP header 620. The CMTS 628 has the ability to look at the values in the TCP header 620. Thus, the modified DOCSIS classification may be performed with expected results.

The results is that [IPv6][IPv4][TCP] is effectively classified as [IPv6][TCP] by specifying a v6 and TCP/UDP classifier 656 and the VSE encoding skips the v4 header, but extracts the v4 protocol 658. The CMTS 628 can thus classify the packet to a low latency SF. This requires the CMTS 628 to be informed, e.g., via TC expansion encoding, such as a VSE encoding, to skip the IPv4 header 618 when the IPv6.NextHeader points to an embedded IPv4 header 618. This has the potential to avoid examining the protocol field in the IPv4 header 618 if the TCP/UDP ports can share a 64K namespace by reserving UDP between 0-32K and TCP between 32K and 64K. The packet then is sent to the AFTR node 630, which performs translation at NAT 638 and then sends the packet out to the Internet.

In FIG. 6, the DSLite (v4 in v6) packet 659 has been operated on by NAT 652 so the IPv6 SIP 660, IPv6 DIP 662, and the Next Header 664 are static. The IPv4 SIP 666 is static and is the NAT IP address 668. The So classification may be based only on a TCP classifier that uses the NAT SPORT value 670 in TCP SPORT field 672. Classification applies to CM 616 and CMTS 630 for both US & DS. Low Latency DS packets will be classified on a DPORT match and redirected to LL service flow, thereby avoiding issues presented by DSCP bleaching. This provides reduced processing in classification by the CMTS 628 and builds on existing the IPv4 solution.

Figure 7:
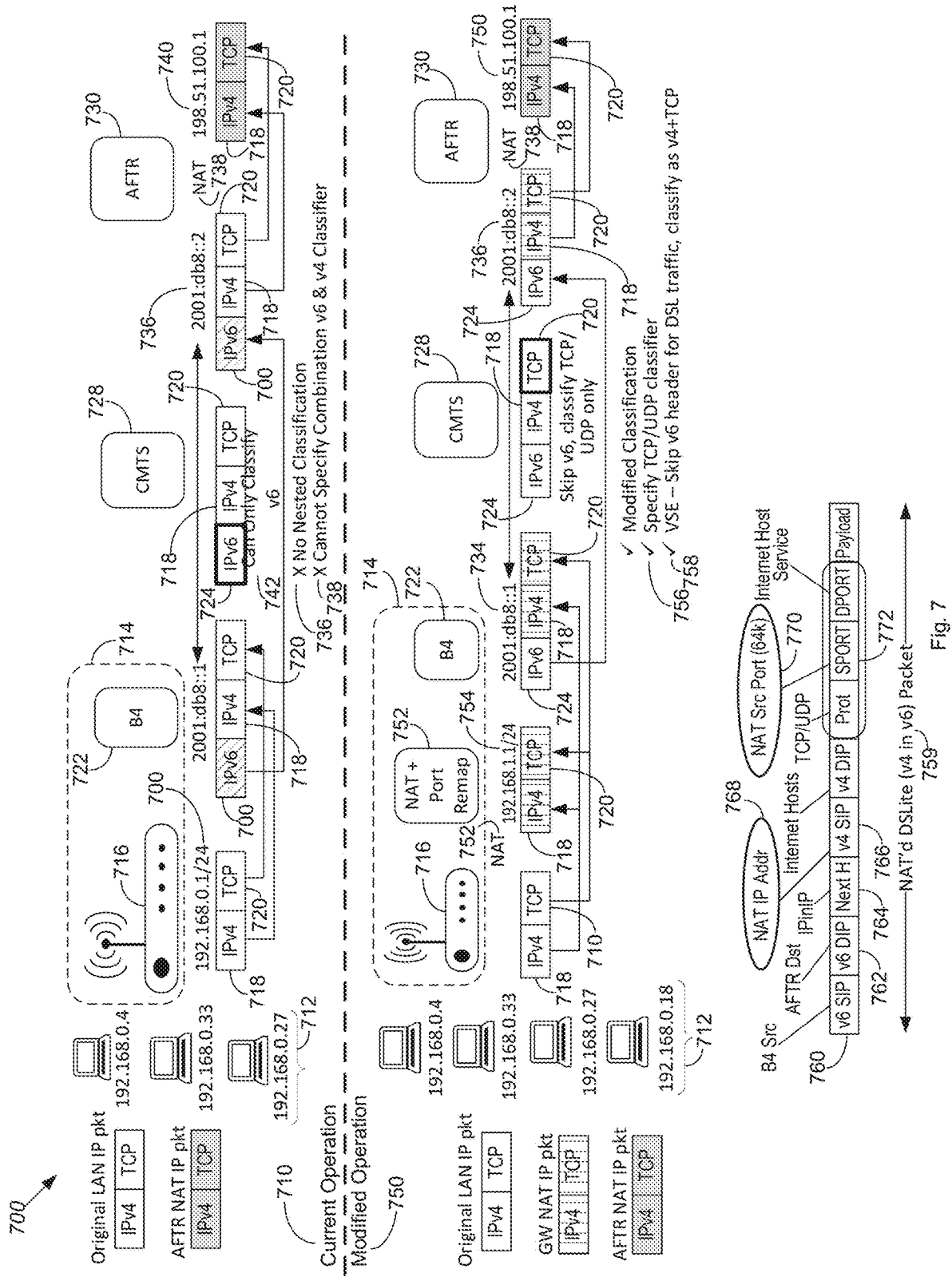
FIG. 7 illustrates a current operation and a modified skip IPv6 classification process.

FIG. 7 illustrates a current operation and a modified skip IPv6 classification process 700.

In FIG. 7, the current operation 710 shows that traffic from any client 712 in the home goes through the gateway 714 in the home. ACM 716 may be provided in the gateway 714. The IPv4 packet includes an IPv4 header 718 and a TCP header 720. The IPv4 packet is then received by the B4 element 722 and the IPv6 header 724 is added onto the IPv4 packet to form an IPinIP packet for a DSLite tunnel. The IPinIP packet is delivered to the CMTS 726. However, the CMTS 728 can only classify using the values in the IPv6 header 724 and cannot classify using the values in the IPv4 header 718 or the values in the TCP header 720. So this packet flows all the way through from the left-hand side up to the AFTR node 730 and then to the Internet.

The IPv4 packet received by the gateway 714 has a source IP address 732. The B4 element 722 creates an DSLite tunnel identified by the TCP SPORT 734 at the B4 and the TCP DPORT 736 at the AFTR node 730. The AFTR node 730 performs operations using NAT 738 send the IPv4 packet using the IPv4 DIP 740. Because only the IPv6 header 724 can be used for classification 742, the CMTS 730 cannot determine individual unique flows at the IPv4 718 and TCP 720 level. Thus, there is no nested classification 744 and a combination of a IPv6 and IPv4 classifier cannot be specified 746.

FIG. 7 shows a modified operation 750 where a DSLite tunneled packet is treated as an IPv4 packet with TCP values. This effectively enables DSLite traffic to be treated as if it were [IPv4][TCP/UDP], for example, by skipping past the IPv6 header with the requirement the NAT 752 is running in the DSLite GW 714. This configuration can operate with and without NAT in the DSLite GW.

All LAN clients have their SPORT translated using a NAT 752 to a single SPORT range on the SIP address. The GW 714 performs NAT 752 to map all LAN clients 712 to a single output IP address 754 in a different subnet. IPv4 NAT must operate between subnets. DSLite provides a first subnet. subnet #1, for the DHCP server in the GW for LAN clients. A second subnet, subnet #2, is added and is used for the address used by the NAT 752 towards the B4 element 722 in the GW 714. All LAN devices are translated to subnet #2, "0.1" address 754, and this traffic is processed by the B4 element 722.

The GW 714 and the home network are the same setup as before. But the values for the IPv4 header 718 and TCP header 720 are translated by NAT 752 and port remapped. The values in the IPv4 header 718 are remapped by NAT 752 to unique values in the IPv4 header 718 and TCP header 720. At the B4 element 722, an IPv6 header 724 is added to the IPv4 packet. The IPv6 tunnel packet is sent to the CMTS 728.

In FIG. 7, the configuration file tells the CMTS to skip the field in the IPv6 header 718 and classify using the IPv4 header 724 and the values in the TCP header 720. The CMTS 728 has the ability to look at the values in the TCP header 720. Thus, the modified DOCSIS classification may be performed with expected results.

The results is that [IPv6][IPv4][TCP] is effectively classified as [IPv4][TCP] by skipping the IPv6 header 724 and specifying only a TCP/UDP classifier 756. The VSE encoding skips the v6 header. A static TCP/UDP only classifiers can be used based on the same IPv4 NAT remapping, where both US and DS traffic are remapped for low latency service.

Once the traffic is received and SkipIPv6 is enabled, the DSLite traffic will be treated as [IPv4][TCP/UDP] and classified accordingly The CMTS 728 can thus classify the packet to a low latency SF. This requires the CMTS 728 to be informed, e.g., via TC expansion encoding, such as a VSE encoding, to skip the IPv6 header 718. The packet then is sent to the AFTR node 730, which performs translation at NAT 738 and then sends the packet out to the Internet.

In FIG. 7, the DSLite (v4 in v6) packet 759 has been operated on by NAT 752 so the IPv6 SIP 760, IPv6 DIP 762, and the Next Header 764 are static. The IPv4 SIP 766 is static and is the NAT IP address 768. The So classification may be based only on a TCP classifier that uses the NAT SPORT value 770 in the TCP SPORT field 772. Classification applies to CM 716 and CMTS 730 for both US & DS.

Figure 8:
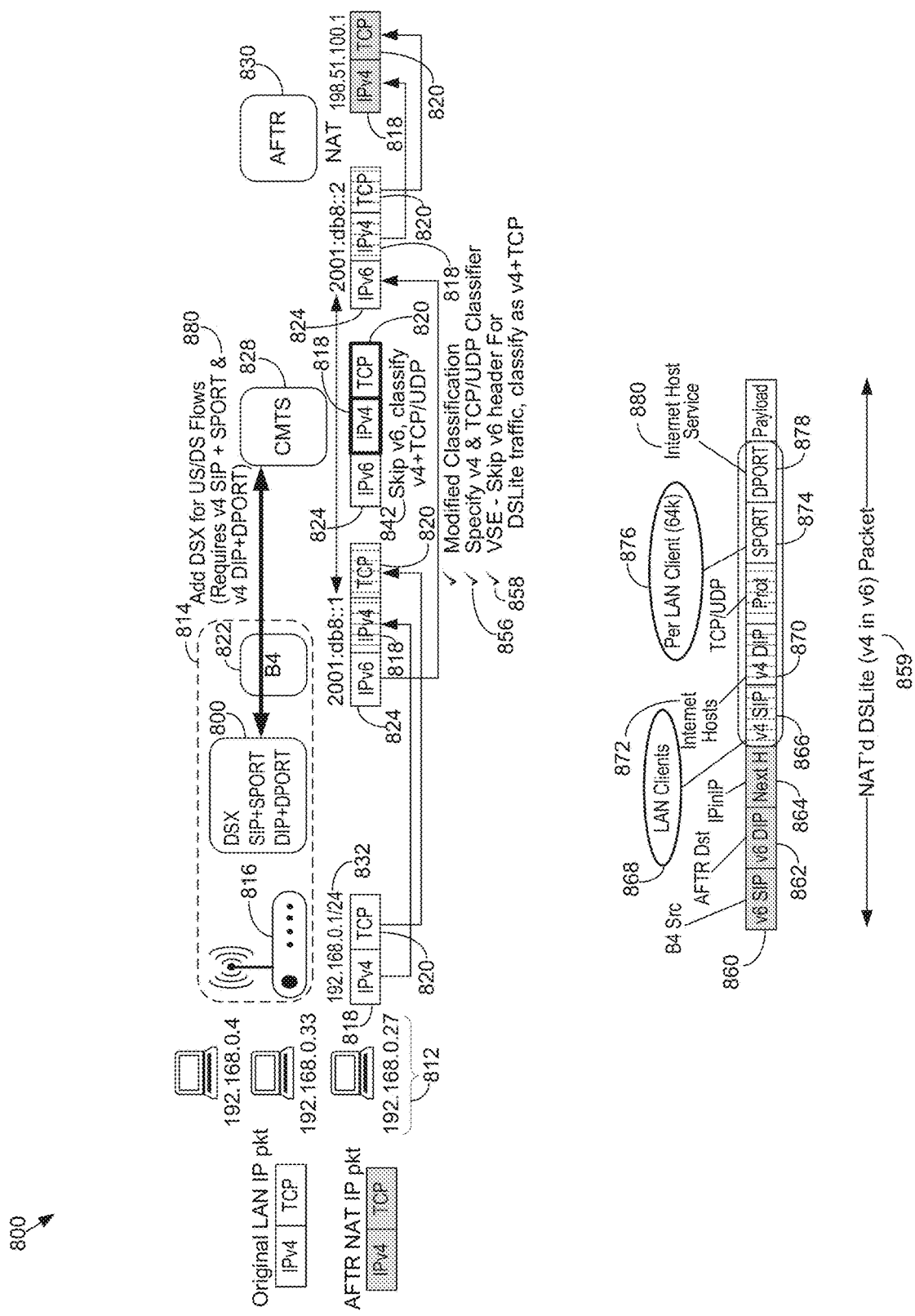
FIG. 8 illustrates a skip IPv6 classification process without using NAT.

FIG. 8 illustrates a skip IPv6 classification process without using NAT 800.

FIG. 8 shows a modified classification operation where no NAT is performed in the gateway 814 and the IPv6 field 824 is skipped.

A DSLite tunneled packet is treated as an IPv4 packet with TCP values. This effectively enables DSLite traffic to be treated as if it were [IPv4][TCP/UDP], for example, by skipping past the IPv6 header. No NAT is running in the DSLite GW 714.

A packet with an IPv4 header 718 and TCP header 720 are received by the GW 814. An IPv6 header is added by the B4 element 822 to provide a DSLite tunneled packet that is sent to the CMTS 828.

Variable LAN client IP addresses 832 and LAN client SPORT values in the TCP header 820 are passed all the way through to the AFTR node 830. Because the LAN client IP addresses 832 and LAN client SPORT values in the TCP header 820 change, a static configuration file cannot be used. Instead, DSX message transaction 890 is invoked to dynamically set up a classifier in the CMTS.

The IPv4 SIP and DIP values in the IPv4 header 818 and the TCP SPORT and DPORT in the TCP header 820 have to be signaled to the CMTS. Thus, if the CMTS sees the specified IPv4 SIP address in the IPv4 header 818 and the TCP SPORT address in the TCP header 820, the CMTS classifies the packet as a low latency SF.

Similarly, if the CMTS sees the specified IPv4 DIP address in the IPv4 header 818 and the TCP DPORT address in the TCP header 820, the CMTS 828 skips the IPv6 header 824 and classifies the packet using IPv4+TDP/UDP 842. Such a packet will thus be classified as a low latency SF.

If NAT is not employed in the GW 814, then all the different LAN SIP addresses from the subnet assigned to the GW 814 from the IPv4 header 818 will be delivered within the DSLite tunnel. This means both the SIP address in the IPv4 header and the SPORT value in the TCP header 820 may conflict. So a simple static TCP/UDP only classifier is not suitable.

To address the multiple variables, DSX message transactions 890 must be employed for each individual low latency service to signal the SIP+SPORT range and DIP+DPORT range for that service, along with the expansion encoding to SkipIPv6.

Once the traffic is received and SkipIPv6 is enabled, the DSLite traffic will be treated as [IPv4][TCP/UDP] and classified accordingly. So, an IPv4 and TCP/UDP classifier is specified 856, and an expansion encoding directs the classifier to skip the IPv6 header for DSLite traffic and to classify as v4+TCP 858.

In FIG. 8, the DSLite (v4 in v6) packet 859 includes the IPv6 SIP 860, IPv6 DIP 862, and the Next Header 864. The IPv4 SIP 866 is provided by LAN clients 868. The IPv4 DIP values 870 designate Internet Hosts 872, the TCP SPORT values 874 are provided by LAN clients (64*k*) 876, and the DPORT values 878 identify Internet Host Services 880. The IPv4 SIP values 866, the DIP values 870, the TCP SPORT values 874, and DPORT values 878 have to be signaled to the CMTS using the DSX message transactions 890 to set up a classifier to skip IPv6 headers, and to classify matching packets using v4+TCP/UDP.

A drawback to this process is that the transaction load on the CMTS is increased, which could lead to scaling issues.

Figure 9:
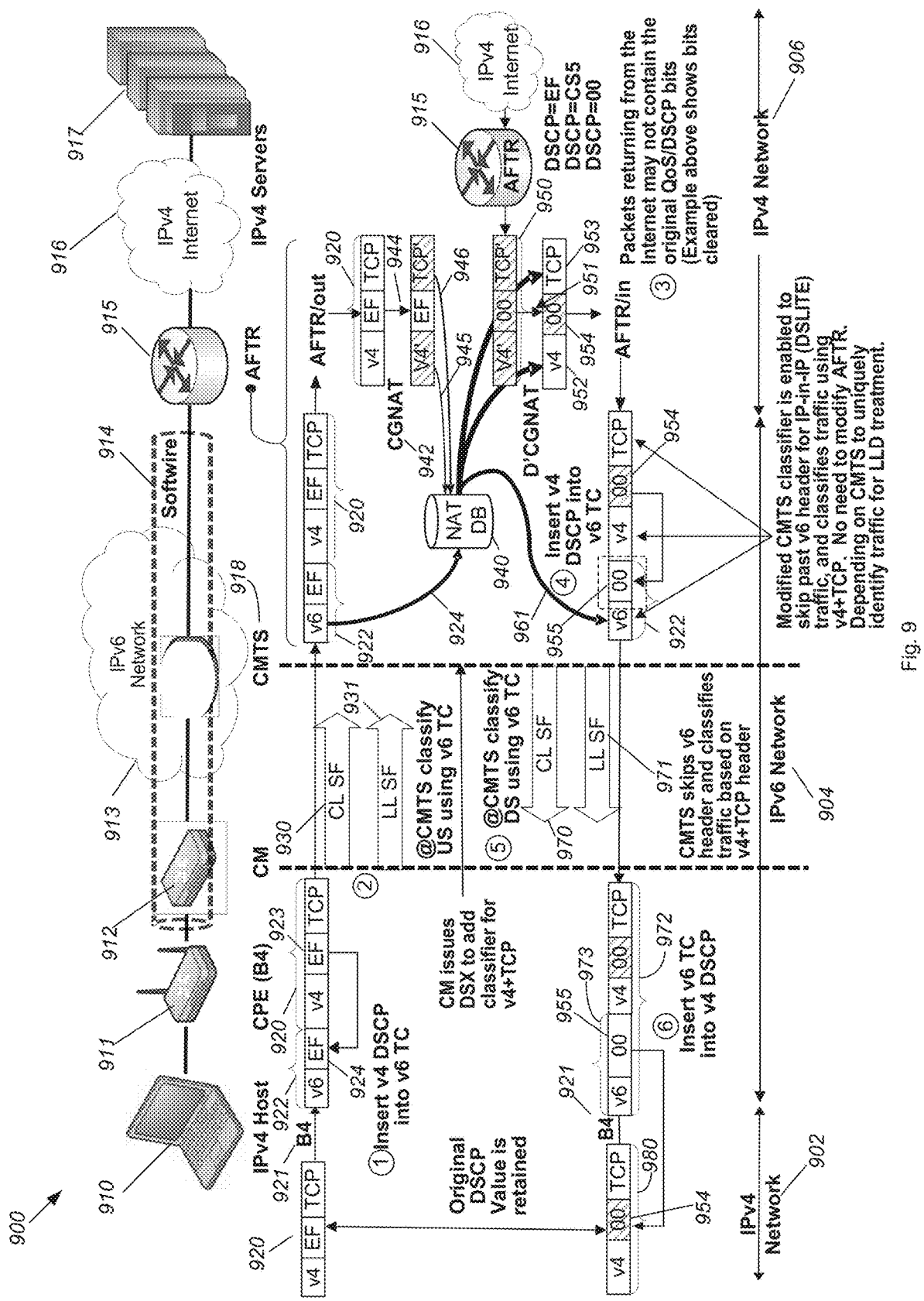
FIG. 9 illustrates a classification process for Upstream (US) and Downstream (DS) packet flows.

FIG. 9 illustrates a classification process for Upstream (US) and Downstream (DS) packet flows 900.

In FIG. 9, the IPv4 DSCP 923 and the IPv6 TC 924 are recorded, for example, in a NAT rule in the NAT database 940. The IP v4 DSCP 923 and the IPv6 TC 934 may be reapplied when processing a reply packet. A policy is used to determine whether to insert the IPv6 TC field value 955 into the IPv4 ToS (Type of Service) field 954 or to keep the value embedded in the IPv4 ToS field 954.

Initially, an IPv4 host 910 in the IPv4 network 902 creates an IPv4 packet 920. The IPv4 packet includes an IPv4 header 920 with the ToS field 923, and a TCP header 919. Here the ToS field 923 is shown having a value of EF, which is for expedited-forwarding so the packet is given a high priority. The B4 element 911 resides in Customer Premise Equipment (CPE) Gateways 911. The B4 process 921 starts when the IPv4 packet 920 is received by the B4 element 911. The B4 element 911 establishes an IPinIP tunnel 914 to connect to an AFTR 915. The IPinIP tunnel 914 created between B4 911 and AFTR 915 may be referred to as a softwire. An IPv6 header 922 is added on IPv4 traffic 920 before passing over the IPinIP tunnel 914 by CM 912. The B4 element 911 inserts a copy of the IPv4 DSCP in the ToS field 923 into the IPv6 TC field 924. The CM 912 receives the IPv6 packet. The CM 912 issues a Dynamic Service Operation (DSX) message to add a classifier for v4 and TCP. The CM 912 forwards it to the CMTS 918 in the IPv6 network 913. The CMTS 918 classifies upstream (US) flows 930, 931 using the value set in the IPv6 TC field 924.

The AFTR element 915 removes the IPv6 header 922 to extract the IPv4 packet 920. A database, such as a NAT database 940, may be is used to translate between private IPv4 addresses within the customer network and one or a few public addresses assigned by the provider, and to store records such as IPv6 or IPv4 data as discussed below. A CGNAT 942 may also be provided within the service provider network to store records.

By the time packets reach the AFTR element 915, IPv6 network 913 may modify the QoS/DSCP bits (if required by network admin policy), or they may remain untouched. The AFTR element 915 stores an IPv6 record including the value of the IPv6 TC field 924 in a database, such as the NAT database 940. The AFTR element 915 also stores the IPv4/TCP header information 920 including the IPv4 DSCP value in the ToS field 923 in the database, e.g., NAT database 940. The AFTR element 915 then transmits the IPv4 packet 920 to the IPv4 Internet 916 and IPv4 servers 917.

IPv4 packets 950 are returned from the Internet 916 and processed by the AFTR element 915. Packets 950 returned from the Internet 916 may not contain the original QoS/DSCP bits, i.e., the bits in the IPv4 ToS field 944. In FIG. 9, the IPv4 ToS bits 954 have been cleared. Thus, the AFTR element 915 retrieves the IPv4 DSCP value in the ToS field 923 that was stored in, for example, the NAT database 940.

The IPv4 DSCP value in the ToS field 923 may be EF 954. The NAT database 940 may be used to translate the destination public IPv4 address 952 in a reply packet sent by the destination IPv4 network 906 to a private IPv4 network 902. The AFTR element 915 obtains the IPv6 header 961. The IPv4 DSCP value in the ToS field 923 may be inserted into the IPv6 TC field 955. The AFTR element 915 then sends the packet over the IPinIP tunnel 914 to the IPv4 host 910.

On the way to the IPv4 host 910, modified classifiers at the CMTS 918 skip past the v6 header 952 and classify the traffic using v4+TCP 971. There is no need to modify the AFTR 915. The CMTS 918 uniquely identifies incoming traffic for low latency DOCSIS (LLD) treatment. The IPinIP packet 972 is processed by the B4 element 921 to remove the IPv6 header 973. A policy is used to determine whether to insert the value in the IPv6 TC field 955 into the IPv4 ToS field 954 in the IPv4 packet 990, to direct the B4 element 911 to keep the embedded IPv4 DSCP value in the ToS field 954.

Figure 10:
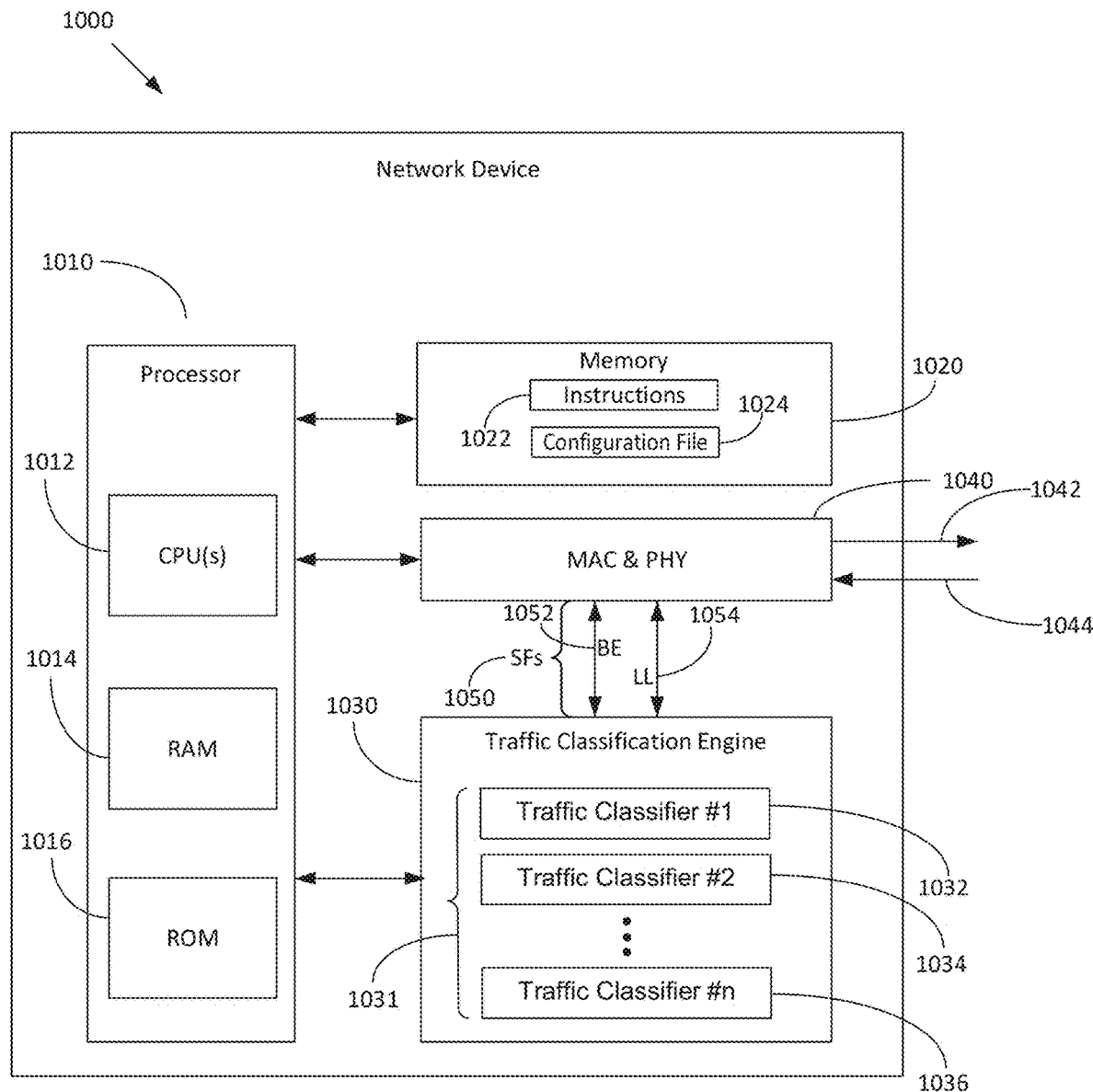
FIG. 10 illustrates a block diagram of the system components.

FIG. 10 illustrates a block diagram of the system components 1000.

In FIG. 10, Network Device 1000 includes a Processor 1010, Memory 1020, Traffic Classification Engine 1030, and a Media Access Controller (MAC) and Physical (PHY) transceiver 1040. Processor 1010 includes CPUs 1012, random access memory (RAM) 1014, and read-only memory (ROM) 1016.

Memory 1020 may store Instructions 1022 and a Configuration File 1024. Configuration File 1024 may include classification encodings or rules for that Processor 1010 uses to implement Traffic Classifiers 1032, 1034, 1036 by Traffic Classification Engine 1030.

Service Flows (SFs) and Traffic Classifiers (TCs) in a CM configuration file identify Quality of Service (QoS) SFs and what traffic flows should be assigned by a TC to that QoS. Classification Engine 1030 include includes one or more traffic classifiers 1031, such as Traffic Classifier #1 1032, Traffic Classifier #2 1034, and Traffic Classifier #n 1036. Traffic classifiers 1031, such as Traffic Classifier #1 1032, Traffic Classifier #2 1034, and Traffic Classifier #n 1036, filter packets according to classification encodings or rules, as discussed above, and assigns appropriate packets to Service Flows (SFs) 1050. SFs 1050 may include, for example, a classic SF 1052 for best effort services, and a low latency SF 1054 for voice calls. A processor 1010 of the network device 1000 implements at least one traffic classifier 1031, such as Traffic Classifier #1 1032, Traffic Classifier #2 1034, and Traffic Classifier #n 1036, to provide classification for tunneled IPinIP traffic based on classification parameters provided by IPv6 classification encoding, IPv4 classification encoding, and TCP/UDP classification encodings, wherein one of the IPv6 classification encoding and the IPv4 classification encoding is provided by extension information to provide extended classification capabilities. The extension information may be a Vendor-Specific Extension (VSE).

The Network Device 1000 receives a tunneled IPinIP packet that includes an IPv6 header, an IPv4 header; and a TCP/UDP header. The processor uses the at least one classifier 1031 to compare the classification parameters provided by the IPv6 classification encoding, the IPv4 classification encoding, and the TCP/UDP classification encodings to fields in an IPv6 header, an IPv4 header, and a TCP/UDP header of the IPinIP packet. Based on the comparison, the processor 1010 maps the IPinIP packet to a service flow identified by the classification parameters. The received tunneled IPinIP packet may include an IPv6 Next Header field value of 4 in the IPv6 header that indicates the received tunneled IPinIP packet includes an embedded IPv4 header.

The IPv4 classification encoding may be provided by the extension information, wherein the at least one classifier 1031 provides IPv6+IPv4+TCP/UDP classification by evaluating the IPv6 header, evaluating the embedded IPv4 header, and evaluating the TCP/UDP header. The evaluating the IPv6 header may include evaluating at least one of a Source IPv6 address or Destination IPv6 address, a Traffic Class, and a Flow Label.

The IPv4 classification encoding is provided by the extension information, the IPv4 classification encoding including instructions for the at least one classifier 1031 to skip the IPv4 header, wherein the at least one classifier 1031 provides [IPv6][TCP/UDP] classification by evaluating the IPv6 header, skipping the IPv4 header, and evaluating the TCP/UDP header. The at least one classifier 1031 evaluates the TCP/UDP header to identify TCP/UDP port values to assign the received tunneled IPinIP packet to a low latency service flow.

The IPv6 classification encoding is provided by the extension information, the IPv6 classification encoding including instructions for the at least one classifier 1031 to skip the IPv6 header, wherein the at least one classifier 1031 provides [IPv4][TCP/UDP] classification by skipping the IPv6 header, and evaluating the IPv4 header and the TCP/UDP header, or skipping the IPv4 header and evaluating the TCP/UDP header.

The MAC layer of MAC/PHY 1040 processes packets that are sent and received. As part of each packet, there is a MAC layer data header that has addressing information as well as packet options. The Physical Transceiver of MAC/PHY 1040 defines the physical and electrical characteristics of the network. It is responsible for modulating and demodulating RF bits that are sent 1042 and received 1044.

Figure 11:
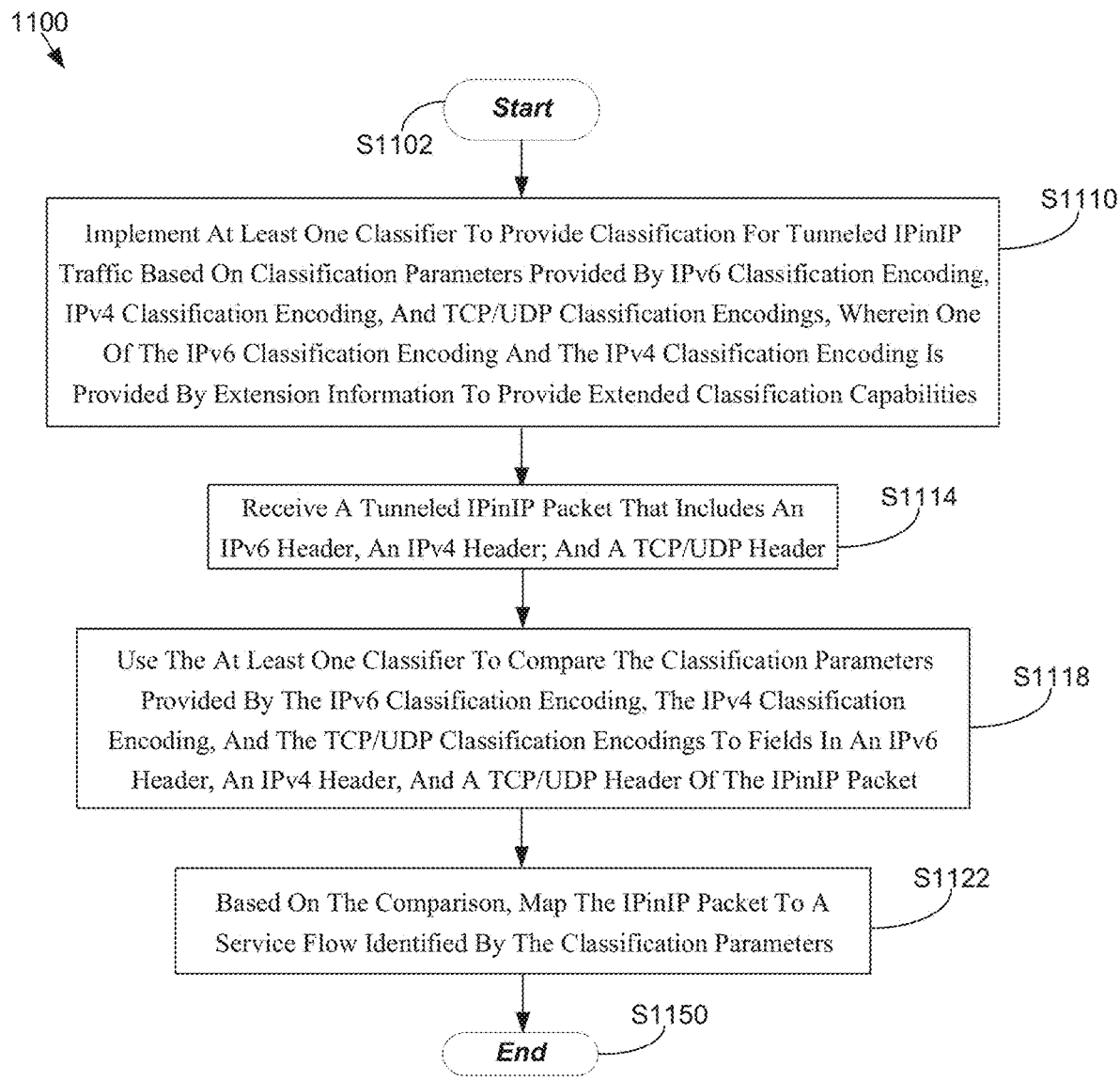
FIG. 11 is a flow chart of a method for enhanced DOCSIS packet classification for tunneled traffic.

FIG. 11 is a flow chart of a method 1100 for enhanced DOCSIS packet classification for tunneled traffic.

In FIG. 11, method 1100 starts (S1102), and a network device implements at least one classifier to provide classification for tunneled IPinIP traffic based on classification parameters provided by IPv6 classification encoding, IPv4 classification encoding, and TCP/UDP classification encodings, wherein one of the IPv6 classification encoding and the IPv4 classification encoding is provided by extension information to provide extended classification capabilities (S1110). Referring to FIG. 10, a processor 1010 of the network device 1000 implements at least one traffic classifier 1031, such as Traffic Classifier #1 1032, Traffic Classifier #2 1034, and Traffic Classifier #n 1036, to provide classification for tunneled IPinIP traffic based on classification parameters provided by IPv6 classification encoding, IPv4 classification encoding, and TCP/UDP classification encodings, wherein one of the IPv6 classification encoding and the IPv4 classification encoding is provided by extension information to provide extended classification capabilities. The extension information may be a Vendor-Specific Extension (VSE).

The IPv4 classification encoding may be provided by the extension information, wherein the at least one classifier 1031 provides IPv6+IPv4+TCP/UDP classification by evaluating the IPv6 header, evaluating the embedded IPv4 header, and evaluating the TCP/UDP header. The evaluating the IPv6 header may include evaluating at least one of a Source IPv6 address or Destination IPv6 address, a Traffic Class, and a Flow Label.

The IPv4 classification encoding is provided by the extension information, the IPv4 classification encoding including instructions for the at least one classifier 1031 to skip the IPv4 header, wherein the at least one classifier 1031 provides [IPv6][TCP/UDP] classification by evaluating the IPv6 header, skipping the IPv4 header, and evaluating the TCP/UDP header. The at least one classifier 1031 evaluates the TCP/UDP header to identify TCP/UDP port values to assign the received tunneled IPinIP packet to a low latency service flow.

The IPv6 classification encoding is provided by the extension information, the IPv6 classification encoding including instructions for the at least one classifier 1031 to skip the IPv6 header, wherein the at least one classifier 1031 provides [IPv4][TCP/UDP] classification by skipping the IPv6 header, and evaluating the IPv4 header and the TCP/UDP header, or skipping the IPv4 header and evaluating the TCP/UDP header.

A tunneled IPinIP packet is received that includes an IPv6 header, an IPv4 header; and a TCP/UDP header (S1114). Referring to FIG. 10, the Network Device 1000 receives a tunneled IPinIP packet that includes an IPv6 header, an IPv4 header; and a TCP/UDP header.

The at least one classifier is used to compare the classification parameters provided by the IPv6 classification encoding, the IPv4 classification encoding, and the TCP/UDP classification encodings to fields in an IPv6 header, an IPv4 header, and a TCP/UDP header of the IPinIP packet (S1118). Referring to FIG. 10, the processor uses the at least one classifier 1031 to compare the classification parameters provided by the IPv6 classification encoding, the IPv4 classification encoding, and the TCP/UDP classification encodings to fields in an IPv6 header, an IPv4 header, and a TCP/UDP header of the IPinIP packet.

Based on the comparison, the IPinIP packet is mapped to a service flow identified by the classification parameters (S1122). Referring to FIG. 10, the processor 1010 maps the IPinIP packet to a service flow identified by the classification parameters.

The method then ends (S1150).

In summary, several classification operations have been described. A CMTS may be configured to classify IPv6, plus IPv4 plus TCP when performing classification. The CMTS may be is configured to skip IPv4 field when performing classification. The CMTS may also be configured to skip IPv6 field and use NAT translation when performing classification. The CMTS may further be configured to skip IPv6 field without NAT translation by using DSX message transaction when performing classification. Some changes in the cable modem and the CMTS may be made, but it does not involve any work with any other piece of equipment in the network.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device, comprising:
   a memory storing computer-readable instructions; and
   a processor configured to execute the computer-readable instructions to:
   implement at least one classifier, wherein the at least one classifier provides classification for tunneled IPinIP traffic, the at least one classifier including classification parameters provided by Internet Protocol Version 6 (IPv6) classification encoding, Internet Protocol Version 4 (IPv4) classification encoding, and Transport Control Protocol/User Datagram Protocol (TCP/UDP) classification encodings, wherein one of the IPv6 classification encoding and the IPv4 classification encoding is provided by extension information to provide extended classification capabilities;
   receive a tunneled IPinIP packet that includes an IPv6 header, an IPv4 header and a TCP/UDP header;

use the at least one classifier to compare the classification parameters provided by the IPv6 classification encoding, the IPv4 classification encoding, and the TCP/UDP classification encodings to fields in an IPv6 header, an IPv4 header, and a TCP/UDP header of the IPinIP packet; and based on the comparison, map the IPinIP packet to a service flow identified by the classification parameters.

2. The network device of claim 1, wherein the received tunneled IPinIP packet includes an IPv6 Next Header field value of 4 in the IPv6 header that indicates the received tunneled IPinIP packet includes an embedded IPv4 header.

3. The network device of claim 1, wherein the IPv4 classification encoding is provided by the extension information, the at least one classifier providing IPv6+IPv4+TCP/UDP classification by evaluating the IPv6 header, evaluating the embedded IPv4 header, and evaluating the TCP/UDP header.

4. The network device of claim 3, wherein the evaluating the IPv6 header includes evaluating at least one of a Source IPv6 address or Destination IPv6 address, a Traffic Class, and a Flow Label.

5. The network device of claim 1, wherein the IPv4 classification encoding is provided by the extension information, the IPv4 classification encoding including instructions for the at least one classifier to skip the IPv4 header, wherein the at least one classifier provides [IPv6][TCP/UDP] classification by evaluating the IPv6 header, skipping the IPv4 header, and evaluating the TCP/UDP header.

6. The network device of claim 5, wherein, the at least one classifier evaluates the TCP/UDP header to identify TCP/UDP port values to assign the received tunneled IPinIP packet to a low latency service flow.

7. The network device of claim 1, wherein the IPv6 classification encoding is provided by the extension information, the IPv6 classification encoding including instructions for the at least one classifier to skip the IPv6 header, wherein the at least one classifier provides [IPv4][TCP/UDP] classification by skipping the IPv6 header, and evaluating the IPv4 header and the TCP/UDP header, or skipping the IPv4 header and evaluating the TCP/UDP header.

8. The network device of claim 1, wherein the extension information comprises a Vendor-Specific Extension (VSE).

9. A method for providing enhanced steam classification for IPinIP tunneled traffic, comprising:

implementing at least one classifier, wherein the at least one classifier provides classification for tunneled IPinIP traffic based on classification parameters provided by Internet Protocol Version 6 (IPv6) classification encoding, Internet Protocol Version 4 (IPv4) classification encoding, and Transport Control Protocol/User Datagram Protocol (TCP/UDP) classification encodings, wherein one of the IPv6 classification encoding and the IPv4 classification encoding is provided by extension information to provide extended classification capabilities;

receiving a tunneled IPinIP packet that includes an IPv6 header, an IPv4 header; and a TCP/UDP header;

using the at least one classifier to compare the classification parameters provided by the IPv6 classification encoding, the IPv4 classification encoding, and the TCP/UDP classification encodings to fields in an IPv6 header, an IPv4 header, and a TCP/UDP header of the IPinIP packet; and based on the comparison, mapping the IPinIP packet to a service flow identified by the classification parameters.

10. The method of claim 9, wherein the receiving the tunneled IPinIP packet further comprises receiving the tunneled IPinIP packet having an IPv6 Next Header field value of 4 in the IPv6 header indicating the received tunneled IPinIP packet includes an embedded IPv4 header.

11. The method of claim 9, wherein the IPv4 classification encoding is provided by the extension information, the at least one classifier providing IPv6+IPv4+TCP/UDP classification by evaluating the IPv6 header, evaluating the embedded IPv4 header, and evaluating the TCP/UDP header.

12. The method of claim 11, wherein the evaluating the IPv6 header includes evaluating at least one of a Source IPv6 address or Destination IPv6 address, a Traffic Class, and a Flow Label.

13. The method of claim 9, wherein the IPv4 classification encoding is provided by the extension information, the IPv4 classification encoding including instructions for the at least one classifier to skip the IPv4 header, the at least one classifier providing [IPv6][TCP/UDP] classification by evaluating the IPv6 header, skipping the IPv4 header, and evaluating the TCP/UDP header, the at least one classifier evaluating the TCP/UDP header to identify TCP/UDP port values to assign the received tunneled IPinIP packet to a low latency service flow.

14. The method of claim 9, wherein the IPv6 classification encoding is provided by the extension information, the IPv6 classification encoding including instructions for the at least one classifier to skip the IPv6 header, the at least one classifier providing [IPv4][TCP/UDP] classification by skipping the IPv6 header, and evaluating the IPv4 header and the TCP/UDP header, or skipping the IPv4 header and evaluating the TCP/UDP header.

15. A non-transitory computer-readable media having computer-readable instructions stored thereon, which when executed by a processor causes the processor to perform operations comprising:

implementing at least one classifier, wherein the at least one classifier provides classification for tunneled IPinIP traffic based on classification parameters provided by Internet Protocol Version 6 (IPv6) classification encoding, Internet Protocol Version 4 (IPv4) classification encoding, and Transport Control Protocol/User Datagram Protocol (TCP/UDP) classification encodings, wherein one of the IPv6 classification encoding and the IPv4 classification encoding is provided by extension information to provide extended classification capabilities;

receiving a tunneled IPinIP packet that includes an IPv6 header, an IPv4 header; and a TCP/UDP header;

using the at least one classifier to compare the classification parameters provided by the IPv6 classification encoding, the IPv4 classification encoding, and the TCP/UDP classification encodings to fields in an IPv6 header, an IPv4 header, and a TCP/UDP header of the IPinIP packet; and based on the comparison, mapping the IPinIP packet to a service flow identified by the classification parameters.

16. The non-transitory computer-readable media of claim 15, wherein the receiving the tunneled IPinIP packet further comprises receiving the tunneled IPinIP packet having an IPv6 Next Header field value of 4 in the IPv6 header indicating the received tunneled IPinIP packet includes an embedded IPv4 header.

17. The non-transitory computer-readable media of claim 15, wherein the IPv4 classification encoding is provided by the extension information, the at least one classifier providing IPv6+IPv4+TCP/UDP classification by evaluating the IPv6 header, evaluating the embedded IPv4 header, and evaluating the TCP/UDP header.

18. The non-transitory computer-readable media of claim 15, wherein the evaluating the IPv6 header includes evaluating at least one of a Source IPv6 address or Destination IPv6 address, a Traffic Class, and a Flow Label.

19. The non-transitory computer-readable media of claim 15, wherein the IPv4 classification encoding is provided by the extension information, the IPv4 classification encoding including instructions for the at least one classifier to skip the IPv4 header, the at least one classifier providing [IPv6][TCP/UDP] classification by evaluating the IPv6 header, skipping the IPv4 header, and evaluating the TCP/UDP header, the at least one classifier evaluating the TCP/UDP header to identify TCP/UDP port values to assign the received tunneled IPinIP packet to a low latency service flow.

20. The non-transitory computer-readable media of claim 15, wherein the IPv6 classification encoding is provided by the extension information, the IPv6 classification encoding including instructions for the at least one classifier to skip the IPv6 header, the at least one classifier providing [IPv4][TCP/UDP] classification by skipping the IPv6 header, and evaluating the IPv4 header and the TCP/UDP header, or skipping the IPv4 header and evaluating the TCP/UDP header.

* * * * *